United States Patent
Kim et al.

(10) Patent No.: US 9,026,772 B2
(45) Date of Patent: May 5, 2015

(54) DISPLAY DEVICE TO PROVIDE INFORMATION TO USERS DURING BOOTING PROCEDURE

(75) Inventors: Young Hwan Kim, Seoul (KR); Woo Hyun Paik, Seoul (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 12/780,103

(22) Filed: May 14, 2010

(65) Prior Publication Data

US 2010/0325409 A1  Dec. 23, 2010

(30) Foreign Application Priority Data

Jun. 17, 2009  (KR) ........................ 10-2009-0053868

(51) Int. Cl.
*G06F 9/00* (2006.01)
*G06F 9/44* (2006.01)

(52) U.S. Cl.
CPC .................................. *G06F 9/4401* (2013.01)

(58) Field of Classification Search
USPC ............................................................ 713/2
See application file for complete search history.

(56) References Cited

U.S. PATENT DOCUMENTS

| | | | |
|---|---|---|---|
| 6,282,642 B1 * | 8/2001 | Cromer et al. ..................... | 713/2 |
| 6,373,498 B1 | 4/2002 | Abgrall | |
| 6,791,572 B1 * | 9/2004 | Cloney et al. .................. | 345/619 |
| 2007/0046816 A1 * | 3/2007 | Hong ............................. | 348/553 |
| 2008/0046613 A1 * | 2/2008 | Lai et al. .......................... | 710/58 |
| 2008/0168265 A1 * | 7/2008 | Arssov ............................... | 713/2 |
| 2009/0064222 A1 * | 3/2009 | Dawson et al. .................. | 725/38 |

FOREIGN PATENT DOCUMENTS

| | | |
|---|---|---|
| CN | 101071556 A | 11/2007 |
| CN | 101436143 | 5/2009 |
| KR | 10-2007-0006461 | 1/2007 |
| KR | 10-678023 | 1/2007 |
| KR | 10-2007-0025364 | 3/2007 |
| KR | 10-2007-0044955 | 5/2007 |
| WO | WO 00/73916 | 12/2000 |

OTHER PUBLICATIONS

PCT Search Report dated May 17, 2010.
Chinese Office Action dated Apr. 18, 2014 for Application 200980160912.2.
Chinese Office Action issued in application No. 200980160912.2 dated Feb. 10, 2015.

* cited by examiner

*Primary Examiner* — Kim Huynh
*Assistant Examiner* — Vincent Chang
(74) *Attorney, Agent, or Firm* — KED & Associates LLP

(57) ABSTRACT

A display device is provided that may include a memory to store a boot screen data to be provided when booting the display device, an interface unit to receive the stored boot screen data and another boot screen data, and a processor to change the stored boot screen data into the other boot screen data that is received in the interface unit, and to control to outputting the boot screen data when booting according to a boot code that includes a command for outputting the boot screen data. A display unit may output the boot screen data according to control of the processor.

14 Claims, 16 Drawing Sheets

DISPLAY DEVICE TO PROVIDE INFORMATION TO USERS DURING BOOTING PROCEDURE

The present application claims priority under 35 U.S.C. 119 and 35 U.S.C. 365 from Korean Patent Application No. 10-2009-0053868, filed Jun. 17, 2009, the subject matter of which is hereby incorporated by reference.

BACKGROUND

1. Field

Embodiments of the present invention may relate to a display device and a control method thereof. More particularly, embodiments may relate to a display device and a control method thereof that may provide visual information and/or auditory information to users while booting the display device and changing information that was provided during booting.

2. Background

Functions of digital display devices, such as digital TV, may be highly advanced. For example, a booting sequence for driving applications may increase when a power supply source of the digital display device is turned on and thereby a booting time may considerably increase.

For recent digital TV, approximately 10 seconds may be taken from a pushing of a power switch to an output of a screen. Since time difference may occur between an input time of the power switch and an output time of the final screen, users may be frustrated because they do not know whether a power supply source is turned on or is turned off.

For shortening the time taken until the initial screen is outputted for a digital TV, the power on sequence should be quickly performed. However, in order to do this, an amount of programs that are stored in flash memory should be reduced. As applications associated with operations of products increases, the above-described method may have limitations, and a booting time may become longer.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
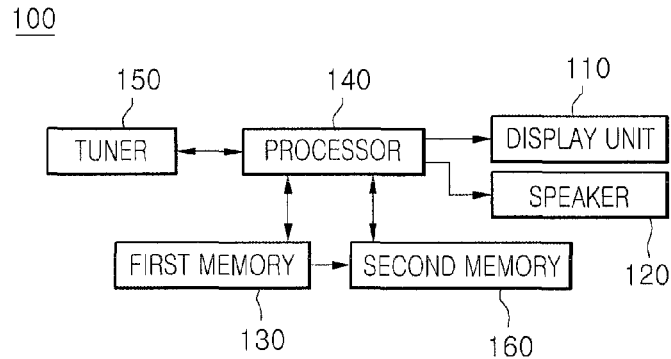
FIG. 1 is a block diagram illustrating a display device according to one embodiment.

FIG. 1 is a block diagram illustrating a display device according to one embodiment. Other embodiments, arrangements and configurations may also be provided.

As shown in FIG. 1, a display device 100 may include a display unit 110 for displaying images, a speaker 120 for outputting sound, a first memory 130 for storing a boot screen data and a boot code, and a processor 140 that performs controlling to output the boot screen data during booting.

A boot screen data may be outputted and displayed by the display unit 110 during booting, and a boot sound data may be auditorily outputted by the speaker 120 during booting. A boot output data may include the boot screen data and the boot sound data, and all kinds of data that may be outputted while booting the display device 100.

The display device 100 may further include a tuner 150 for receiving a broadcasting signal, and a second memory 16. The second memory 16 may be an additional memory that loads a boot code when executing the boot code that is stored in the first memory 130.

The display device 100 may be any one of various electronic devices on which a display unit is mounted, such as digital TV and monitors.

The display unit 110 may be any one of various image display devices such as Liquid Crystal Displays (LCD), Plasma Display Panels (PDP), Electro Luminescent Displays (ELD) and/or Vacuum Fluorescent Displays (VFD).

The first memory 130 may be a flash memory, and may store boot codes for booting the display device 100, the boot screen data that is displayed in the display unit 110 during booting and the boot sound data that is outputted to the speaker 120 during booting.

The second memory 16 may be an additional storage medium that temporarily loads boot codes or command codes when the processor 140 executes the boot code or another command that is stored in the first memory 130. An access speed of the second memory 160 may be faster than the first memory 130. For example, the second memory 160 may be a Synchronous Dynamic Random Access Memory (SDRAM).

As a controller for controlling overall functions of the display device 100, the processor 140 may process an audio signal, video signal and data broadcasting signal of a broadcasting signal, which is received from the tuner 150, in output-enabled types to output the processed signals to the display unit 110 or the speaker 120 when the display device 100 is a digital TV. Broadcom company's 3563 chip or 3549 chip may be used as the processor 140, for example.

A portion of function modules for configuring the processor 140 may be driven at an initial stage of booting according to the boot code that is stored in the first memory 130, thereby controlling the output of the boot screen data.

Figure 2:
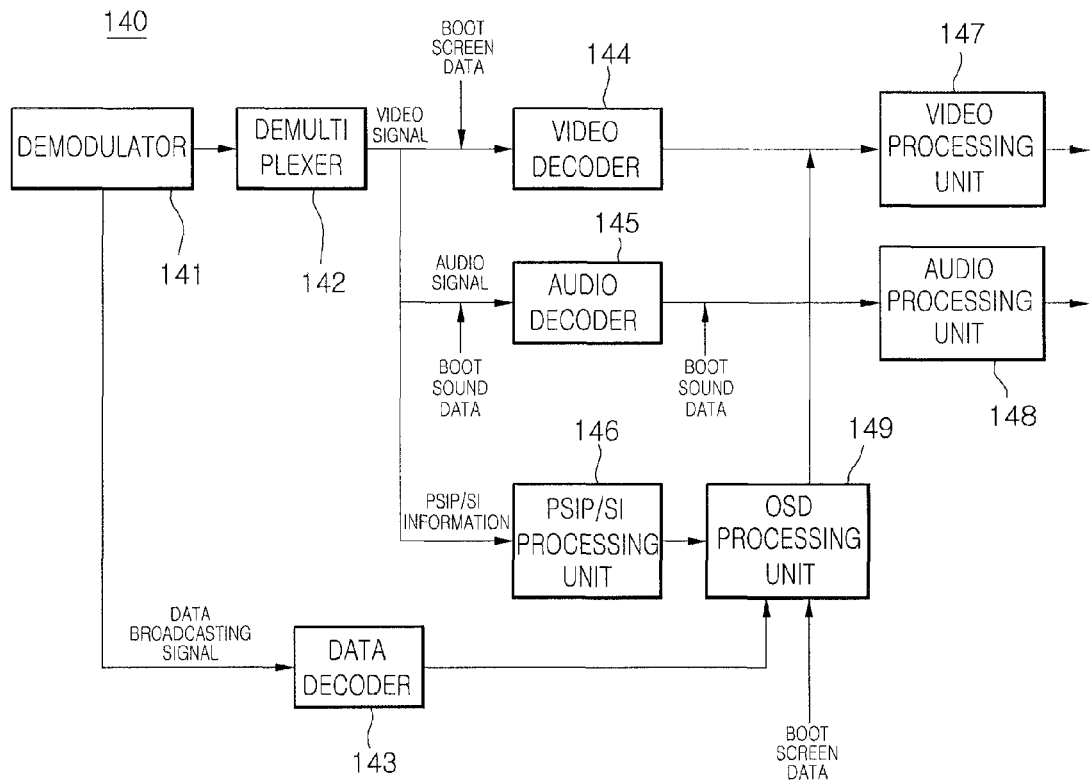
FIG. 2 is a block diagram illustrating a processor when the display device (FIG. 1) is a digital TV.

FIG. 2 is a block diagram illustrating the processor 140 when the display device 100 (in FIG. 1) is a digital TV.

A digital broadcasting signal that is received through the tuner 150 may be demodulated by a demodulator 141 of the display unit 110 and may thereby be divided into a video signal, an audio signal and a data broadcasting signal. The video signal and the audio signal may be parsed into a video signal, an audio signal and system information (PSIP/SI information) by a demultiplexer 142. The parsed signals may be decoded through a video decoder 144, an audio decoder 145 and a PSIP/SI processing unit 146, respectively. The video signal may be changed into an output-enabled signal by a video processing unit 147, and the changed signal may be transferred to the display unit 110. The audio signal may be changed into an output-enabled sound signal by an audio processing unit 148, and the changed signal may be transferred to the speaker 120.

The system information may be processed in the PSIP/SI processing unit 146, and may be changed into a type that may be outputted to an OSD layer by an OSD processing unit 149. The video processing unit 147 may change the changed information and the decoded video signal to output-enabled signals and may output the changed signals to the display unit 110.

The data broadcasting signal (among the signals that have been divided through the demultiplexer 142) may be decoded according to a user's request, or programs included in the data broadcasting signal may be executed and thereby the data broadcasting signal may be changed into a type that may be outputted to the OSD layer by the OSD processing unit 149. The video processing unit 147 may change the changed signal and the decoded video signal to output-enabled signals and transfer the changed signals to the display unit 110.

FIG. 2 illustrates elements of the processor 140 when the display device 100 is a digital TV. The elements of the processor 140 shown in FIG. 2 may be different when the display device 100 is another kind of display device that differs from the digital TV, such as a monitor or a kiosk display.

As shown in FIG. 2, the boot screen data may be transferred to the OSD processing unit 149, and the video processing unit 147 may process the boot screen data and the output of the video decoder 144 to output the processed data. As described below, this may correspond to a case in which the boot screen data (from among the video outputs) is outputted to the OSD layer. In a case of intending to output the boot screen data to a video layer, the boot screen data and the video signal may be provided to a front port of the video decoder 144.

As shown in FIG. 2, when the boot sound data requires no decoding because it is not compressed, the boot sound data may be transferred to the output port of the audio decoder 145. When the boot sound data requires decoding, the boot sound data and the audio signal may be transferred to the front port of the audio decoder 145.

Figure 3:
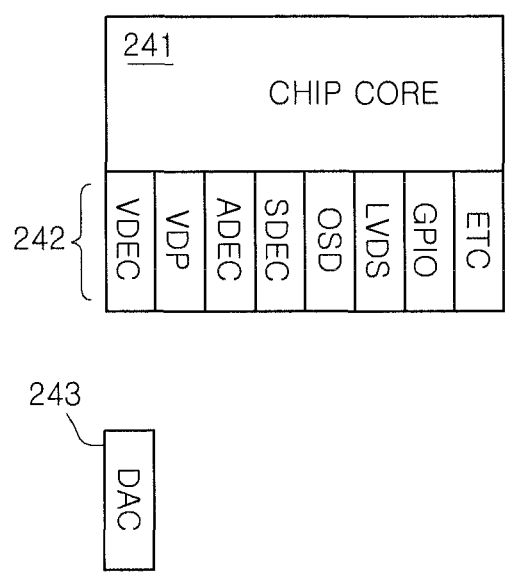
FIG. 3 is a diagram illustrating an internal configuration of a processor (FIG. 1) that is implemented with a single System On Chip (SOC)

FIG. 3 illustrates an internal configuration of the processor 140 that is implemented with a single System On Chip (SOC) when the display device 100 (in FIG. 1) is a digital TV.

As shown in FIG. 3, an SOC chip type of the processor 140 may be configured with a chip core 241 and a function module part 242.

The chip core 241 may control overall operations of the processor 140. When a power supply source is turned on, the chip core 241 may operate first to initialize the function module part 242, and control the operation of the function module part 242. The chip core 241 may use ARM9, MIPS and ARC chips, for example.

The function module part 242 may be configured with function modules for controlling specific operations of the processor 140. The function modules may include a video decoding module (VDEC), a video display module (VDP), an audio decoding module (ADEC), a system decoding module (SDEC), an On Screen Display module (OSD), a Low-Voltage Differential Signaling module (LVDS), and/or a General Purpose Input Output module (GPIO). The function modules may further include at least one additional module based on a function of the processor 140.

When a module is not included in an SOC chip although it is required for the function of the processor 140 or an additional module is further required although the module is already included, a separate module having a corresponding function may be mounted on a mother board and may be used in connection with the SOC chip. For converting an audio signal into a signal suitable for being outputted to a speaker, for example, a Digital Analog Conversion (DAC) chip may be further required in addition to the ADEC. In this example, an external chip 243 may be mounted on a board on which a processor is mounted and may be used in connection with the processor.

The VDEC may decode a video signal that is received in a compressed state like MPEG2, and may serve as the video decoder 144 in FIG. 2.

The VDP may be a module that converts the decoded video signal into an output-enabled type of signal, and may serve as the video processing unit 147 (in FIG. 2).

The ADEC may decode an audio signal that is received in a compressed state (e.g. AC3) to convert it into an output-enabled type of signal, and may serve as the audio decoder 145 in FIG. 2.

The SDEC may be a module that parses the video signal, the audio signal and the data broadcasting signal of a broadcasting signal that is received in a Transport Stream (TS) state, and may perform functions of the demodulator 141, the demultiplexer 142 and the PSIP/SI processing unit 146 in FIG. 2.

The OSD may control output of a video signal that is outputted to an OSD layer when outputting the video signal, and may serve as the OSD processing unit 149 in FIG. 2.

Figure 4:
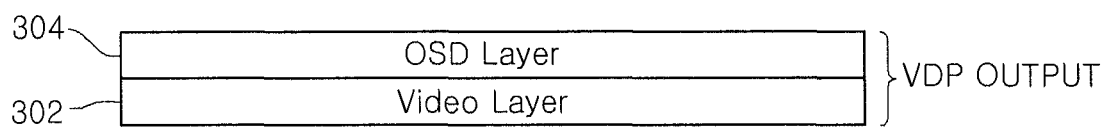
FIG. 4 is a diagram illustrating two virtual layers that configure an output of a display unit.

To provide a more detailed description on the OSD layer, as shown in FIG. 4, the output of the display unit 110 may be configured with two virtual layers. A video layer 302 may be one to which a video signal corresponding to substantial content is outputted. For example, in case of a digital TV, a video broadcasting signal and a signal that corresponds to video content in multimedia, such as DVD players, are outputted through the video layer 302. An OSD layer 304 may be one that is used to display image information for displaying the state information of the display unit 110 or information associated with manipulating of the display unit 110 such as a menu screen, channel information and/or a volume state when setting a monitor instead of substantial content, to a user.

A signal outputted to the video layer 302 and a signal outputted to the OSD layer 304 may be combined to become one video signal that may be outputted by the VDP.

As described above, a position for receiving the boot screen data may be changed according to which layer the boot screen data is outputted to.

The LVDS may be a module that allows a video signal or an audio signal to efficiently be transferred to the display unit 110 or the speaker 120 at high speed.

The GOIP may transfer the boot screen data to the display unit 110 or transfer the boot sound data to the speaker 120.

A minimum number of modules necessary for video output among the above-described function modules may be the VDP, the OSD, the LVDS and the GOIP. A portion of the modules may be omitted or added, and may be replaced with another module that performs the same function for an added function or a further improved function. For example, when a video signal is compressed, the VDEC for decoding the compressed video signal may be required.

A minimum number of modules necessary for sound output may be an ADC module, the LVDS and the GPIO. Among these modules, the DAC module may be one that converts an audio signal into an output-enabled type of signal that may be outputted to the outside, and since it is not included in the processor 140 in FIG. 3, as described above, an external chip 243 may be used. At least one module may be added for an added function or a further improved function, a portion of the modules may be replaced with another module that performs the same function. For example, when an audio signal is compressed, the ADEC for decoding the compressed audio signal may be required.

Figure 5:
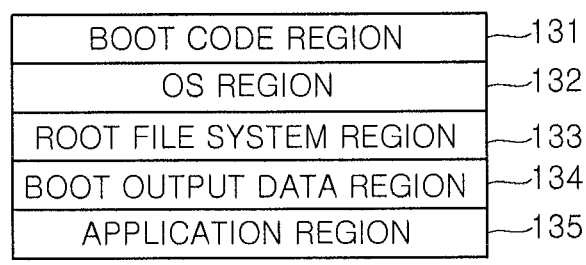
FIG. 5 is a diagram illustrating an internal structure of a first memory.

FIG. 5 illustrates an internal structure of the first memory 130 (FIG. 1). The first memory 130 may store information related to the boot code (or a boot loader) and booting sequence of the display device 100 and information that requires initialization or driving for a normal operation. As shown in FIG. 5, the first memory 130 may be divided into a plurality of regions.

The boot code region 131 may store boot codes for initializing hardware of the display device 100. The boot code region 131 may store a command code that enables to call and output a boot screen data or a boot sound data that is stored in a boot output data region 134. The boot code region 131 may store a code that drives a module necessary for output of a boot output data (for example, the boot screen data or the boot sound data).

An operating system (OS) region 132 may store information necessary for driving the OS of the display device 100.

A root file system region 133 may store information necessary for initializing a file system that is used in a storage device such as a memory or a hard disk of the display device 100. The root file system region 133 may be omitted or included in the OS region 132.

The boot output data region 134 may store the boot output data to be outputted in executing of a boot code. The boot output data may include a boot screen data or a boot sound data. Alternatively, the boot output data may be updated through a method that may be described below.

An application region 135 may store information for driving application programs for implementing all sorts of functions of the display device 100.

The boot screen data may be outputted to the display unit 110 while booting the display device 100, and may be configured with an image and text type of additional information.

Figure 6:
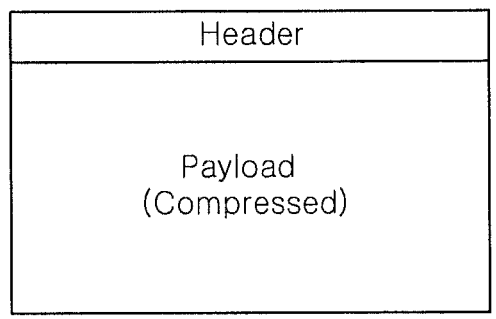
FIG. 6 is a diagram illustrating a format of data that is stored in a boot output data region of the first memory.

Data that is stored in the boot output data region 134 of the first memory 130 may be stored in a format such as shown in FIG. 6.

In FIG. 6, a header may include information related to kind of data (i.e., whether a boot screen data is an image, a text or sound), information associated with configuration of an image or sound data and information on size of data. A specific boot screen data or boot sound data may be compressed and stored in a payload.

Figure 7:
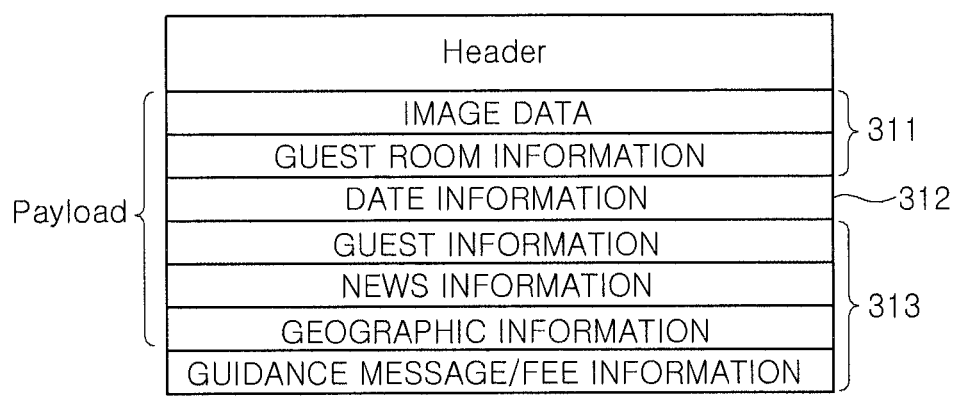
FIG. 7 is a diagram illustrating a file configuration of a boot screen data according to one embodiment.

FIG. 7 illustrates a file configuration of a boot screen data according to one embodiment. Other formats may also be provided.

The above-described content may be stored in the header of the boot image data, and additional information or image information that is included in an image data may be stored in the payload of the boot image data.

In FIG. 7, the image data may be an image that configures a background of a boot image. A boot screen data that is stored in the payload may be information that is displayed in a screen when booting the display device 100, and may be an arbitrary type of visual information that may be used for usability of a display device, users' convenience, guidance for users and providing information to users. The image data may have an image file format, and other information may have a text type of file form. Information may be stored in a dynamic image file format or an image file format such as icons. For example, weather information may be stored together with text information such as clearness, cloudiness and rain and an icon corresponding to the text information.

When the display device is a digital TV that is provided at guest rooms of hotels, the boot screen data may include information useful for guests, for example, a guest room number, a guest name, news and/or weather. The boot screen data may include information that a hotel operator intends to provide to guests, for example, a near map, hotel introduction, a bill and/or advertisements.

The image data of the boot screen data may include an image that a user has set for seeing it when booting. For example, the image data of the boot screen data may include a flash screen and a channel browsing that includes photographs of favorite persons, images that are captured while viewing a TV or a DVD or thumbnails of preference channels that have been recently generated.

By configuring the image data of the boot screen data with a video file or a flash file, the image data of the boot screen data may be configured to output a video, and may be configured as an image data that is configured with a set of images capable of being sequentially displayed and being displayed as if moving. A storage region for dynamic images or flash files may be separately generated in a boot screen data file.

In FIG. 7, a change method may be changed according to an attribute of information included in the boot screen data. Among the information included in the boot screen, an image data and guest room information 311 may be updated when the display device 100 is turned on, and they are information independent of the display of information that is updated when being booted. On the other hand, date information 312 and guest information, weather information and news information 313 may be information that requires the display of already-updated information when a user turns on the display device 100 for a first time. Updated information may be required from a time when the user starts using the display device 100. For example, when a guest checks in, enters a room of a hotel and turns on the TV, updated information may be immediately displayed. That is, guest information, weather information and news information may be information that requires an update when the display device 100 is turned off.

Figure 8:
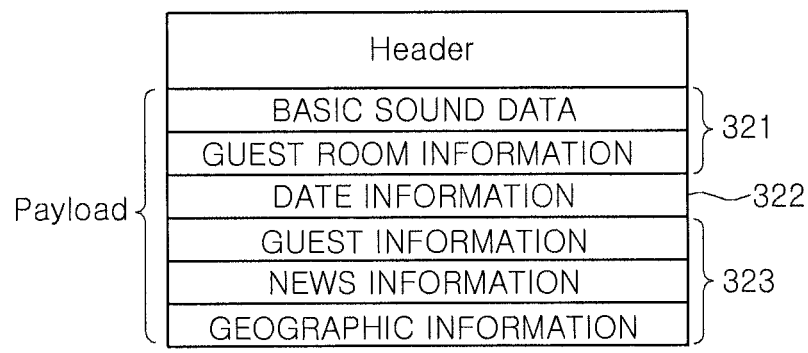
FIG. 8 is a diagram illustrating a file format of a boot sound data according to one embodiment.

FIG. 8 illustrates a file format of a boot sound data according to one embodiment. Other formats may also be provided.

The above-described content may be stored in a header of the boot sound data, and a basic sound data region for storing a basic sound data and various information capable of being outputted as sound may be stored in a payload of the boot sound data. When the display device 100 is a digital TV that is provided at guest rooms of hotels, the boot sound data may include information on guest rooms. The boot sound data may include information to be provided to staying guests, such as a guest name, news and/or weather.

When a guest enters the guest room of a hotel and turns on a digital TV, information stored in the boot sound data may be outputted as sound through a speaker during booting. For example, when a calm music data is stored in the basic sound data and a sex and name of a guest are stored in guest information, sounds such as "Welcome Mr. John" may be provided to a user together with calm music.

Basic sound data may be stored in an arbitrary sound file format, and guest information, news information and weather information may be stored as text information. When outputting information that is stored as text information, a Text-To-Speech (ITS) module, which is well known to those skilled in the art, may be used for converting the information into sound.

Like the boot image data, information included in the boot sound data may also be divided into information 321 independent of an update when the display device is turned on and information 322, 323 requiring an update when the display device is turned off. An update method may be changed according to an attribute of the each information.

FIGS. 9 to 12 illustrate boot screens on which a plurality of boot screen data are outputted.

Figure 9:
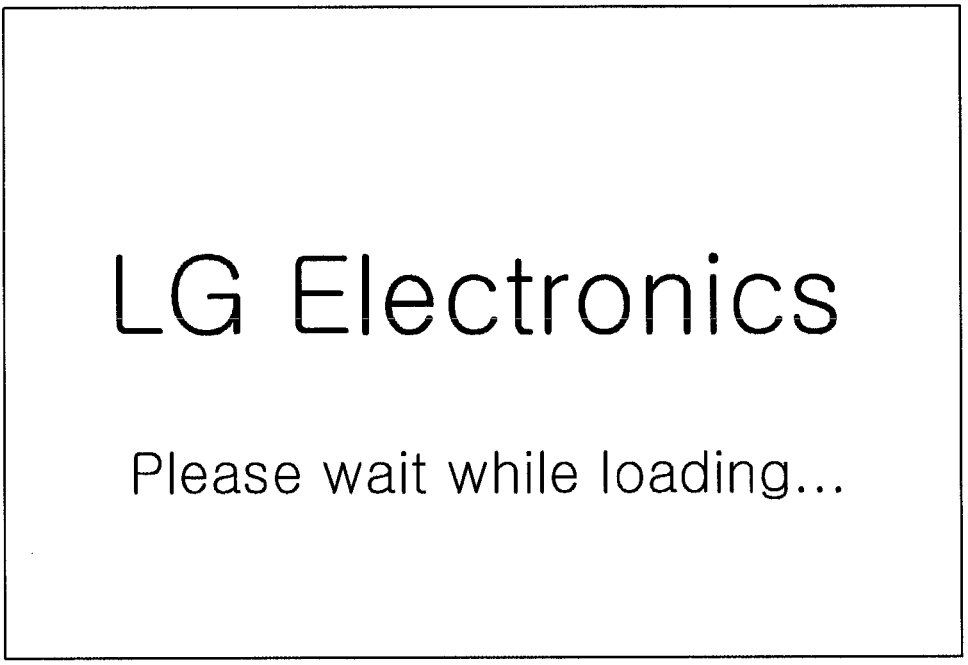
FIGS. 9 to 12 are diagrams illustrating boot screens on which a plurality of boot screen data are outputted according to one embodiment.

In FIG. 9, a default image that is stored in the first memory by a manufacturer when the display device is sold for the first time may include a logo of the manufacturing company of the display device or a message indicating that booting is being currently performed.

Figure 10:

When the display device is a digital TV that is sold to a hotel operator and is provided at the guest room of the hotel, as shown in FIG. 10, the hotel operator may change/update a manufacturing company logo that is stored as a default into/to its own hotel logo and thereby change a boot screen.

Figure 11:
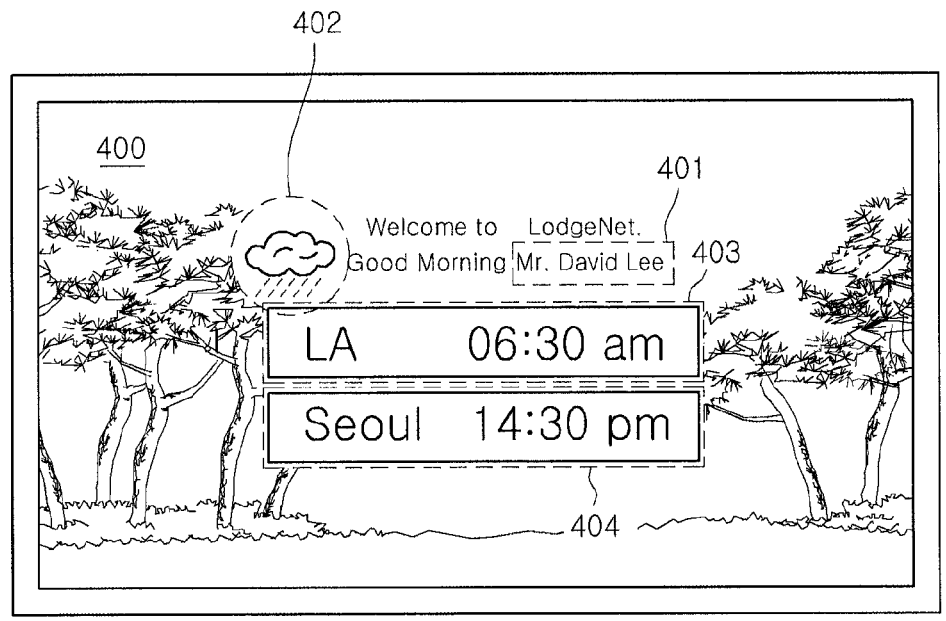

A hotel operator (or other person) that has purchased the display device may configure a boot screen as shown in FIG. 11. As shown in FIG. 11, a boot image may include a background image 400, staying guest information 401, information 402 on weather of the day, local time information 403 and time information 404 on a departure place of a staying guest. The boot image may include various information to be provided to guests.

In FIG. 11, among information included in the boot screen, guest names and weather information may require update, and as described below, they may be changed through various change methods and may then be displayed.

The local time information 403 may be acquired from system clock information in the display device 100, and the time information 404 on a departure place of a staying guest may be calculated for the local time information and may be displayed.

According to one embodiment, a boot image data may be configured as a flash file, and may be configured as an image data that is configured with a set of images capable of being sequentially displayed and may be displayed as if moving. A dynamic image may be displayed on a boot screen rather than a still image.

In FIG. 11, the background image 400 and the additional information 401-404 may be displayed at a same time, and may be sequentially displayed at certain time intervals. The background image 400 may be first displayed and the additional information 401-404 may be displayed in a type where they are added to the background image 400 one by one.

Figure 12:
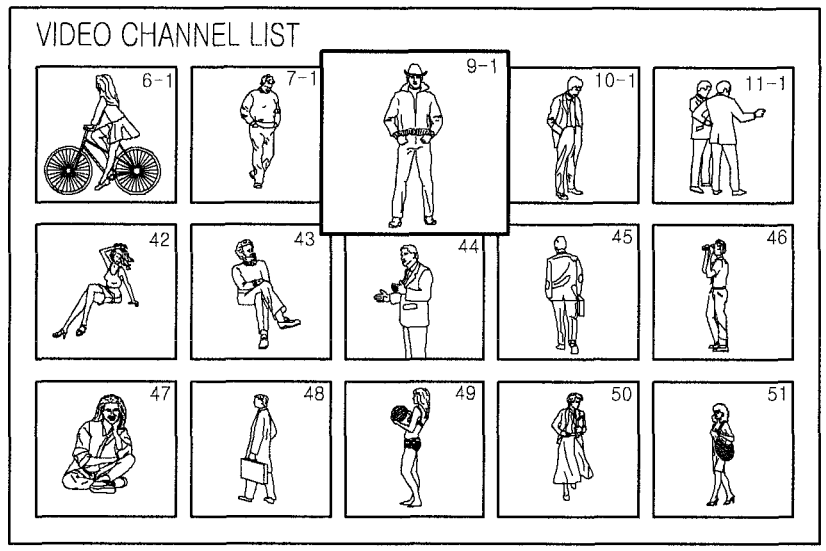

FIG. 12 illustrates a channel browser screen as a boot screen. A digital TV having a plurality of channels and an external input signal may scan the plurality of channels and the image of the external input signal to extract a thumbnail, process the thumbnail and display the processed thumbnail on the display unit 110 in order for a user to easily recognize the channels and the external input signal. The displayed screen may be the channel browser screen. The user may select a desired channel and the external input signal while watching the channel browser screen.

The display device may scan channels and an external input signal at certain time intervals, for example, at intervals of 10 minutes, in a waiting state (i.e., a standby state to extract the thumbnail of an external input signal and an image that is inputted or is being currently broadcasted at each channel) and may store the extracted thumbnails in the image data region of the boot screen data. That is, a thumbnail for configuring a channel browser may be continuously updated at certain time intervals.

When a user turns on the display device, a thumbnail that is stored during booting may be displayed as shown in FIG. 12. Such an operation may be implemented by a display device having the configuration of FIG. 20, for example.

In FIGS. 9 to 12, although the boot screen includes only the boot screen data capable of being outputted to the display unit, information capable of being represented as sound (from among the information of FIGS. 9 to 12) may be outputted as boot sound through the speaker.

The above-described boot screen data or boot sound data may be outputted as different images or sound by time when the display device is turned on (i.e., by time in the morning, noon and evening) in addition to the above-described information. Alternatively, the boot screen data or boot sound data may be outputted as different images or sound by season or data. The image data (FIG. 7) or the basic sound data (FIG. 8) may store a plurality of images or a sound file, and a media data that is outputted by time or date may be differently designated and outputted.

On the assumption that the display device is a digital TV provided in the guest room of a hotel, a message (received to a mobile phone that a user is using) or telephone information during the user's absence may be received over a wired/wireless network when the digital TV is turned off. When the display device is booted, the received message or the telephone information during the user's absence may be displayed as a boot image data in the display device. The received message or the telephone information during the user's absence may be outputted as a boot sound data in voice through the speaker. Such an operation, as described below, may be implemented through a display device having the configuration of FIG. 23, for example.

A method for generating or changing the boot screen data or the boot sound data may be described below. The boot screen data or the boot sound data may be configured in an appropriate file format and/or file size.

Figure 13:
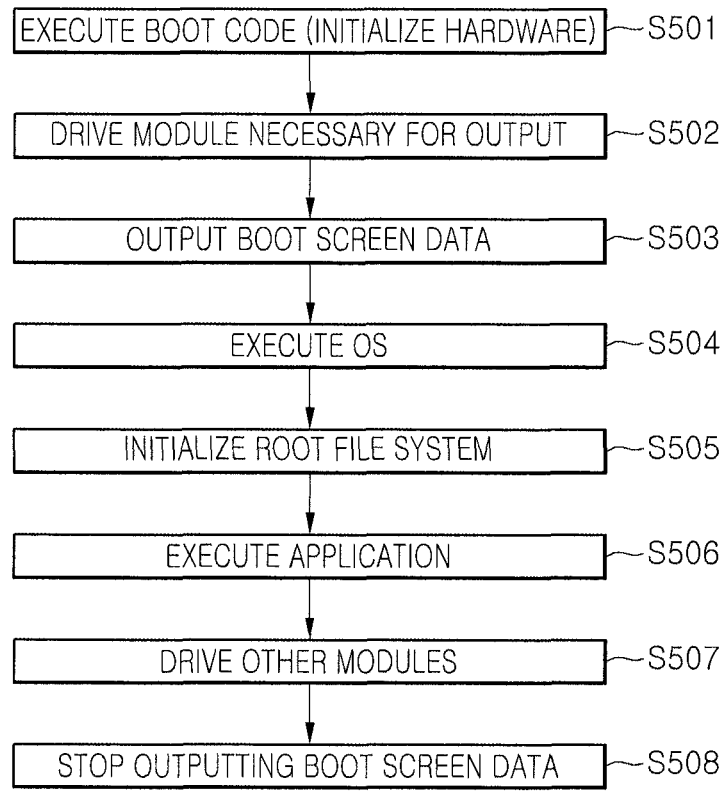
FIG. 13 is a flow chart illustrating a booting operation of a display device according to one embodiment.

FIG. 13 illustrates a booting operation of a display device according to one embodiment. Other operations and embodiments may also be provided.

The display device may execute a boot code to initialize hardware in operation S501. The boot code may include a code for outputting a boot screen data or a boot sound data. For outputting the boot screen data, modules associated with video output or sound output among function modules for configuring a processor may be driven.

A code for driving a function module, which may be necessary for outputting the boot code and the boot screen data that initialize hardware, may be written with a program language suitable for assembly language, C language and/or other hardware. Specific boot code may be changed.

A user may select an attribute and output level of a boot screen data or boot sound data to be outputted or a booting mode. A function module that is driven for outputting the boot screen data may be changed according to the attribute and output level or the booting mode that is selected by the user.

The user may select the booting mode of the display device. For example, the user may select a kind of boot media that is outputted in the booting mode. The display device may be set to output only a boot image, or the display device may be set to output only a boot sound. Alternatively, a boot screen output function may be set in a disabled state so that the boot media may not be outputted. The kind of function module that is driven when booting may be changed according to the selected kind of boot media.

The user may set the output level of the boot screen data or boot sound data. For example, when intending to output the boot screen data to a video layer instead of an OSD layer, the VDEC from among the function modules may also be driven when booting. The kind of function module that is driven when booting may be variously changed according to function and kind of the display device.

A user interface screen may be configured and displayed so that the user can select the kinds and output levels of the boot screen data and boot sound data that are outputted when booting after the display device is turned on.

The display device may output the boot screen data or the boot sound data in operation S502. A boot image data may be outputted as shown in FIGS. 9 to 12 while booting the display device, and a dynamic image such as a flash file may also be included. The boot sound data may include various information as described above, and it may be outputted through the speaker during booting.

While outputting the boot screen data, successive boot sequences may be executed. The kernel or OS of the processor 140 may be driven, the root file system of the display device 100 may be initialized, and applications for the normal operation of the display device 100 may be executed in operations S503 to S506. Specific boot sequences may be changed from the method shown in FIG. 13.

After the applications are executed, other function modules, which are not driven by the boot code, for normal operation of the display device and other modules external to the processor 140 may be driven, the display device has a state in which it may operate normally.

When booting is completed, all sorts of video signals and sound signals are respectively outputted to the display unit and the speaker of the display device, and the output of the boot screen data that is being outputted during booting may be stopped in operation S508.

As soon as a booting sequence is begun, some modules related to the video output or the sound output from among function modules to be executed after the execution of the application are first driven, and the boot screen data or the boot sound data may be outputted even during booting. Through such an operation, in image display devices such as a digital TV having a long booting time, the image display device may enable a user to recognize that it is operating as soon as a power supply source is turned on, and by displaying appropriate information on the boot image during booting, the image display device may display advertisements or provide necessary various information to the user.

The following description may relate to methods for changing a boot screen data or boot sound data that is outputted while booting a display device.

The boost screen data or the boot sound data, as described above, may be stored in the boot output data region 134 of a flash memory, and may be changed through various methods.

The display device may receive new data through various interface units, and may replace the data that is stored in the boot output data region 134 with the new data. After the change, a new boot output data may be outputted when successive booting, thereby providing a new boot screen and boot sound.

Figure 14:
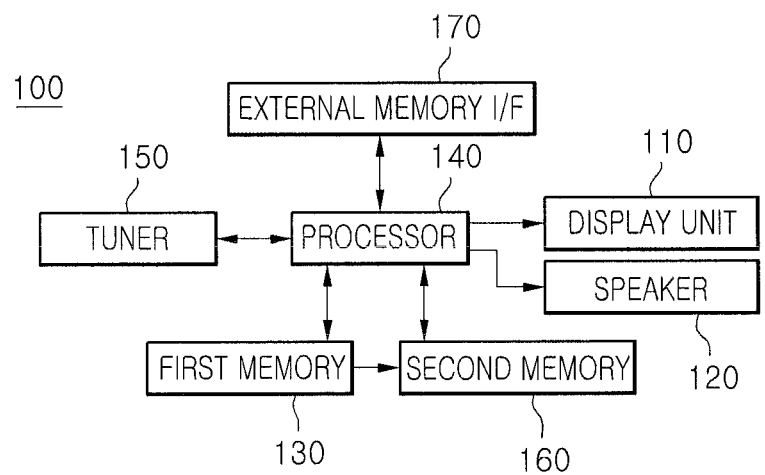
FIG. 14 is a block diagram illustrating a display device that may change a boot output data using an external memory device as an interface unit, according to one embodiment.

FIG. 14 illustrates a display device 100 that may change a boot output data using an external memory device as an interface unit, according to one embodiment.

The display device 100 shown in FIG. 14 is a digital TV. The display device 100 includes a display unit 110, a speaker 120, a first memory 130, a processor 140, a tuner 150, and a second memory 160. The configuration and operations of these elements may be the same or similar as FIG. 1.

An external memory interface (I/F) 170 may be connected to and may recognize an external memory. The external memory may be one of various kinds of external storage mediums such as USB memory devices, SD cards, MicroSD cards and/or external hard disks. The external memory may store a file that includes data for replacing the existing boot screen data or boot sound data.

A new boot output data file may have a specific file name. In a state where the display device 100 is turned on, the processor 140 may automatically recognize an external memory device when the external memory device is coupled to the external memory interface 170, and may search a boot output file having a specific file name in the external memory device. When the boot output data file is searched, the display device 100 may read and store the searched file to the second memory 160, and overwrite the read file in the boot screen data or boot sound data of a boot output data region from among information that is stored in the first memory 130, thereby replacing data. Therefore, a changed boot output data may be outputted from successive booting.

A separate driver for an operation may be required based on a kind of external memory device. The display device 100 may search a driver necessary for another server connected over a network and download the searched driver. The driver may be installed in the first memory 130 or the second memory 160 of the display device 100 (or the storage device of the display device 100), and when the connection of the external memory device is detected, the display device 100 may perform the above operation after driving a corresponding driver.

Even in the example where the display device 100 is in a standby mode, the display device 100 may be automatically turned on when the external memory device is connected, and it may perform the above operation in a turned-on state.

When the display device 100 is a digital TV provided for each of the guest rooms of hotels, the display device 100 may be connected to an external memory device storing the same update file and may thereby be updated.

Figure 15:
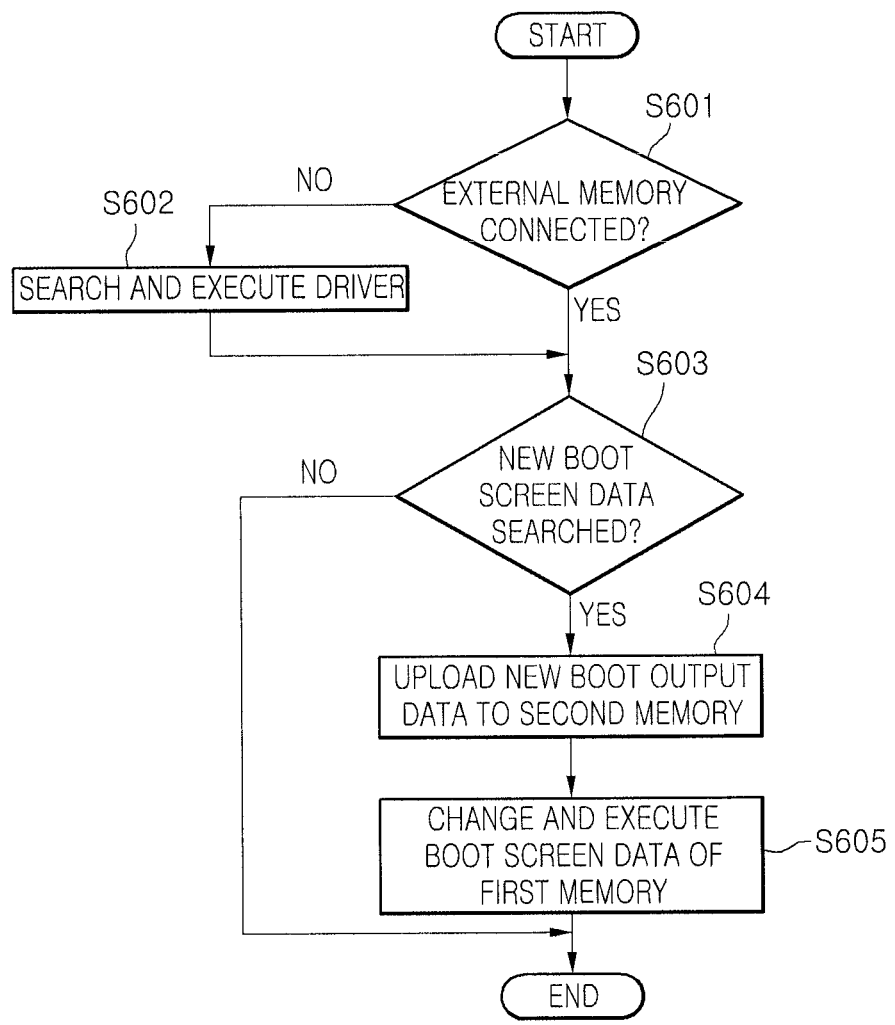
FIG. 15 is a flow chart illustrating a method for changing a boot output data through an external memory device, according to one embodiment.

FIG. 15 is a flow chart illustrating a method for changing a boot output data through an external memory device, according to one embodiment.

When an external memory device is connected, the display device may automatically recognize the connected memory device in operation S601. When the external memory device is not automatically recognized, the display device may search and execute a driver in operation S602, and proceed to successive stages.

The display device may search a boot output data file having a specific file name in the external memory device in operation S603. When not searched, the display device may end a process.

The display device may upload a new boot output data file to the second memory 160 in operation S604.

The display device may overwrite the uploaded new boot output data file in the boot output data region of the first memory 130 in operation S605.

Figure 16:
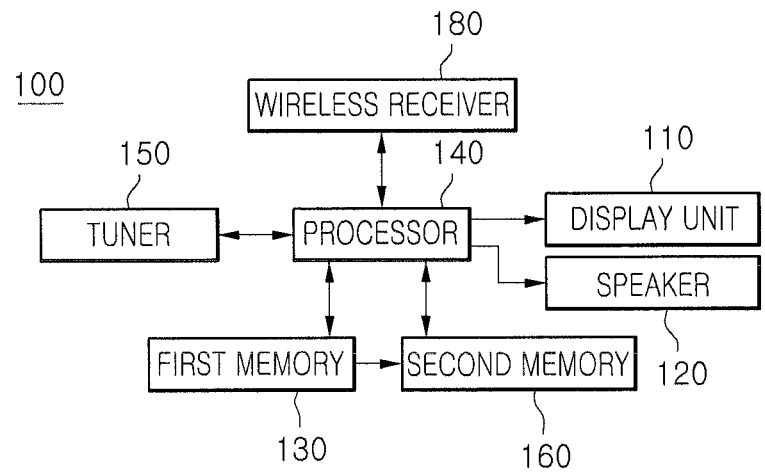
FIG. 16 is a flow chart illustrating a display device that may change a boot output data through a wireless communication means such as IR or RF, according to one embodiment.

FIG. 16 illustrates a display device that may change a boot output data through a wireless communication means such as infrared (IR) or radio frequency (RF), according to one embodiment.

The display device 100 shown in FIG. 16 is a digital TV. The display device 100 may include a display unit 110, a speaker 120, a first memory 130, a processor 140, a tuner 150, and a second memory 160. The configuration and operations of these elements may be the same as or similar to FIG. 1.

The display device 100 may include a wireless receiver 180 that may receive a wireless signal such as an IR signal or an RF signal. An infrared remote controller or a remote controller including an RF transmission module or a manipulation terminal may transmit a wireless signal to the wireless receiver 180. A file that includes data for replacing the existing boot screen data or boot sound data may be included in a signal that the infrared remote controller or the RF transmission module transmits, and the signal may be transferred to the wireless receiver 180.

A new boot output data file that is received in the wireless receiver 180 may have a specific file name. Alternatively, a signal including a new boot output data may include an identifier in its header for indicating a boot output data. In a state where the display device 100 is turned on, when a new boot output data file is received in the wireless receiver 180, the processor 140 may determine (or check) that the received data is the boot output data from a file name or an identifier that is marked in the specific field of a transmitted signal.

When the received data is determined as being the boot output data, the display device reads a file to the second memory 160 in an example where the file is searched, and overwrites the read file in the boot screen data or boot sound data of a boot output data region from among information that is stored in the first memory 130, thereby replacing data. Therefore, a changed boot output data may be outputted from successive booting.

Since the wireless receiver 180 may operate even when a digital TV is in a standby state, the display device 100 may receive a new boot output data in the standby state and output the new boot output data when successive booting.

When the display device 100 is a digital TV provided for each of the guest rooms of hotels, each display device 100 may be connected to an infrared remote controller or an RF transmission terminal that stores the same update file and may thereby be updated.

Figure 17:
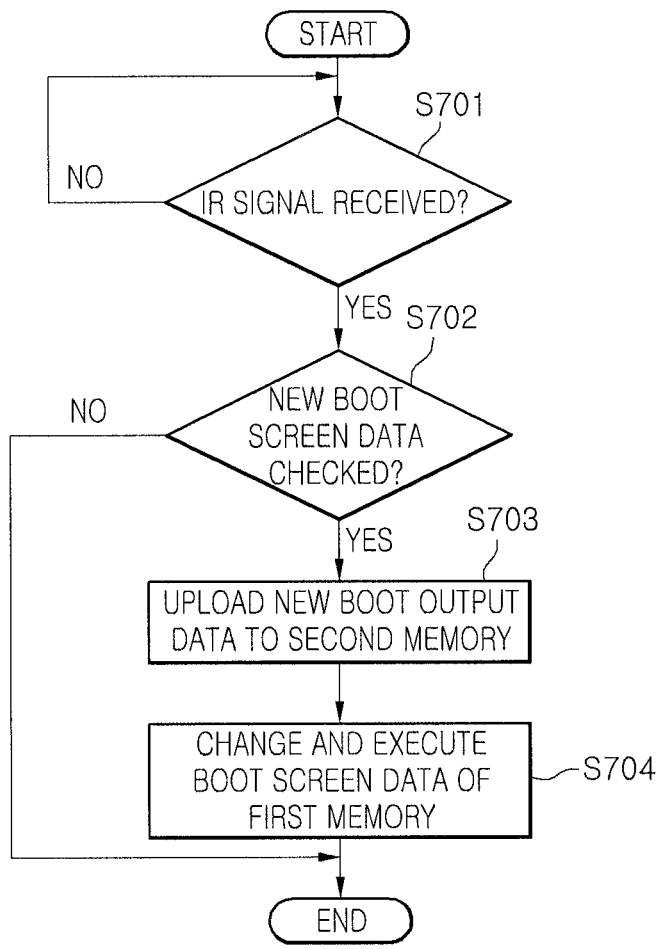
FIG. 17 is a flow chart illustrating a method for changing a boot output data through a wireless communication module, according to one embodiment.

FIG. 17 is a flow chart illustrating a method for changing a boot output data through a wireless communication module, according to one embodiment.

The display device may determine (or check) whether a wireless signal such as an IR signal or an RF signal is received through the wireless receiver 180 in operation S701. When the signal is not received, the display device may continuously maintain a signal waiting state. When an external memory device is connected, the display device may automatically recognize the connected memory device.

The display device may determine (or check) whether a boot output data is included in the received wireless signal through a file name or an identifier included in the header of a signal. When a new boot output data is not determined (or checked) in operation S702, the display device may end a process.

The display device may upload a received new boot output data file to the second memory 160 in operation S703.

The display device may overwrite the uploaded new boot output data file in the boot output data region of the first memory 130 in operation S704.

When the display device is a digital TV, the boot output data of the digital TV may be changed by including a new boot output data in a broadcasting signal.

For example, by preparing a middle server in a middle of a root for receiving a broadcasting signal, the update information of a boot screen data (i.e., a new boot output data) may be included in the data broadcasting signal of the original broadcasting signal received, and the broadcasting signal may be transmitted to the display device. When the display device that receives update information is turned on, a boot output data may be updated based on the received update information, and when the display device is turned on a next time (i.e., is booted), an updated data (i.e., a changed boot output data) may be outputted.

Figure 18:
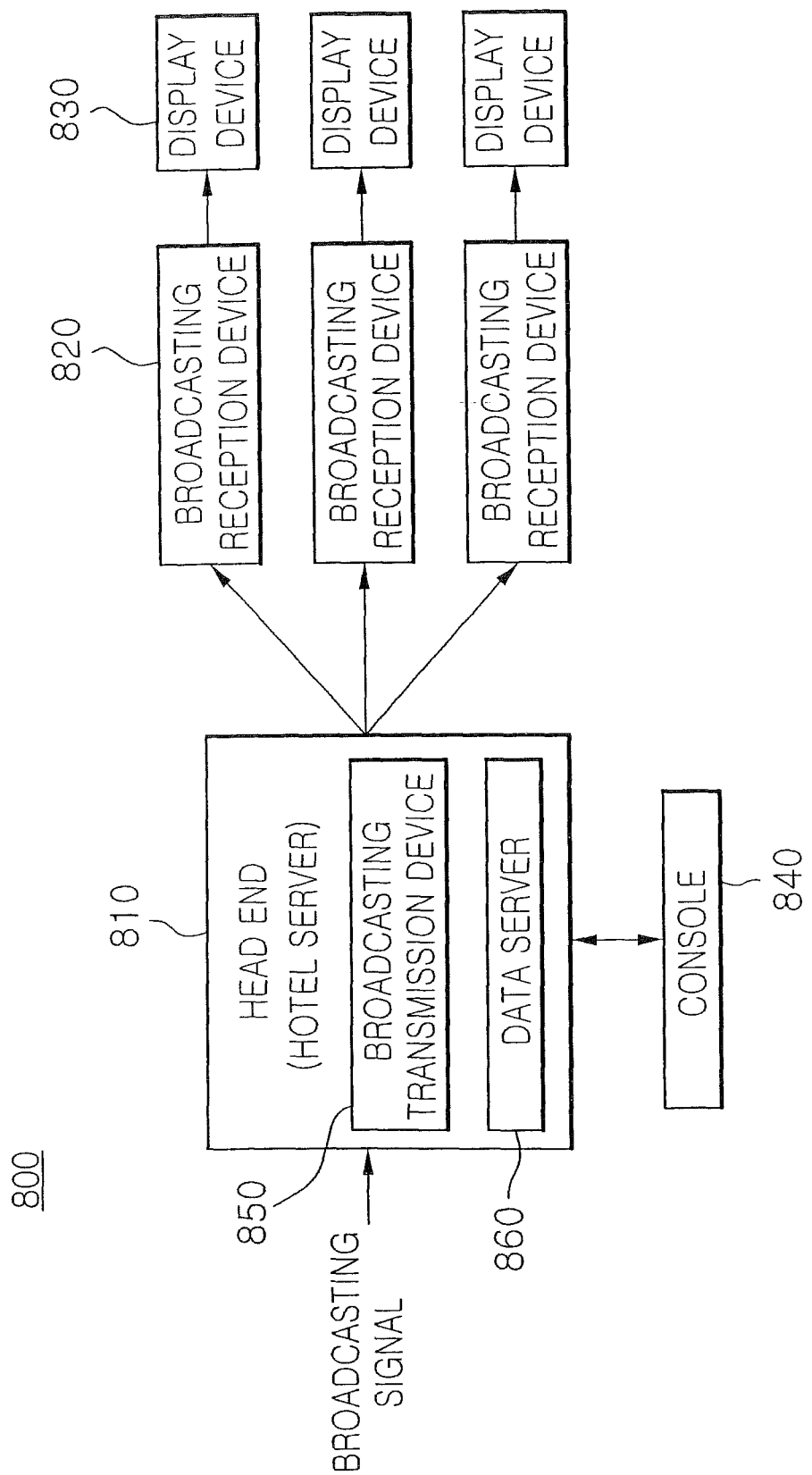
FIG. 18 is a block diagram illustrating a network system that receives a broadcasting signal to retransmit a received signal to a broadcasting reception device, according to one embodiment.

FIG. 18 is a block diagram illustrating a network system 800 for implementing the above-described change method, according to one embodiment.

The network system shown in FIG. 18 may be applied to places, such as hotels or large restaurants, that require managing a plurality of display devices or digital TVs. An example in which the network system 800 is applied to a hotel may be described.

The network system 800 may include a head end 810 that receives a broadcasting signal to retransmit the received signal to a plurality of display devices 830, a plurality of broadcasting reception devices 820 that receive broadcasting from the head end 810 to select the broadcasting, a plurality of display devices 830, and a console 840 for controlling the head end 810.

The display device 830 may be a digital TV or a monitor that is provided in each of the guest rooms of hotels, and the broadcasting reception device 820 may be a set-top box. The head end 810 may be a hotel server that is provided in each of the management rooms of the hotels. The head end 810 may appropriately change a received broadcasting signal, or may carry a necessary message in the broadcasting signal to retransmit it to the display devices 830. A manager, such as a hotel manager, may control the head end 810 through the console 840 to control a broadcasting signal that is transmitted to the display device 830.

The head end 810 may receive a broadcasting signal from the outside to transmit the received signal to the broadcasting reception device 820. The broadcasting reception device 820 may extract and process a video signal (which generally includes an audio signal) corresponding to a channel that is selected by a user from among the received broadcasting signal and output the processed signal to the display device 830.

The head end 810 may include a broadcasting transmission device 850 and a data server 860. The broadcasting transmission device 850 may provide a broadcasting signal, which is received from the outside over satellite or cable, to the broadcasting reception device 830. The data server 860 may provide an application data for data broadcasting service to the broadcasting reception device 820. The application data may include a new boot output data for replacing a boot output data that is outputted when booting the broadcasting reception device 820.

The broadcasting transmission device 850 may include a plurality of broadcasting signal reception terminals, and may receive various contents from a plurality of broadcasting providers over a terrestrial antenna, a satellite antenna and/or a wired/wireless communication network using cables. The broadcasting transmission device 850 may allocate received contents to a plurality of broadcasting channels to transmit the contents to the broadcasting reception device 820.

The broadcasting reception device 820 may receive the video signal of a broadcasting channel that is selected by the user from among a broadcasting signal transmitted from the broadcasting transmission device 850, and it may receive an application data for data broadcasting that is transmitted from the data server 860.

The broadcasting reception device 820 may change the video signal of the received broadcasting channel and the application data for the data broadcasting into signals that may be outputted in the display device 830 and output the changed signals to the display device 830.

The display device 830 may display the video of the broadcasting channel by using a video signal that is inputted from the broadcasting reception device 820, and the display device 830 may provide data broadcasting service according to the user's request.

The broadcasting reception device 820 may be a set-top box (STB) that receives a broadcasting signal over a wired/wireless network that changes the received broadcasting signal into a signal that may be outputted in the display device 830 and that outputs the changed signal to the display device 830.

The broadcasting reception device 820 is not limited to the set-top box, and may include other devices that may receive a broadcasting signal, which is transmitted from the outside, to output the received signal to the display device 830 that is connected by cable or is wireless.

The display device 830 may display video by using a signal that is inputted from the broadcasting reception device 820, for example, may display the video through various display schemes such as LCD, PDP, ELD and VFD.

Alternatively, the broadcasting reception device 820 may be connected to the display device 830 through High Definition Multimedia Interface (HDMI), Digital Visual Interface (DVI) or D-Sub cable. However, connection between the broadcasting reception device 820 and the display device 830 may not be limited to the above-described connection scheme, and may be connected over cables that are used in various communication systems. The broadcasting reception device 820 and the display device 830 may not be limited to being connected by cable, and may be connected over a wireless network using a near wireless communication such as ZigBee, Bluetooth and/or Wlan.

The broadcasting reception device 820 may be integrated with the display device 830. The broadcasting reception device 820 may be embedded in the display device 830, and a device that is manufactured by integrating the broadcasting reception device 820 and the display device 830 may be a digital TV.

The video of a broadcasting channel and the video of data broadcasting service that are selected by a user may be simultaneously displayed on one screen in the display device 830. The broadcasting reception device 820 may combine the video signal of a broadcasting channel received from the broadcasting transmission device 850 and an application data received from the data server 860, process the combined video signal and application data to be displayed on one screen, and output the processed signal and application data to the display device 830.

For the broadcasting reception device 820 receiving an application data for the data broadcasting service and a new boot output data from the data server 860 without changing a broadcasting channel that is currently being viewed, the application data and the new boot output data may be transmitted to the broadcasting reception device 820 over the broadcasting channel and an independent data dedicated channel.

The new boot output data of the broadcasting reception device 820, the display device 830 and/or a device that is manufactured by combining the broadcasting reception device 820 and the display device 830 may be included in the application data.

The broadcasting transmission device 850 may allocate a broadcasting signal received from the outside to a plurality of preset broadcasting channels to transmit the broadcasting signal to the broadcasting reception device 820, and the data server 860 may transmit the application data to the broadcasting reception device 820 over a data dedicated channel that is configured with a channel independent of the broadcasting channels. Therefore, the broadcasting reception device 820 may simultaneously receive the video signal of a broadcasting channel that a user is currently viewing and an application data for the data broadcasting. By including update information in the application data to transmit it, the boot screen data of the broadcasting reception device 820, the display device 830 and/or a device that is manufactured by combining the broadcasting reception device 820 and the display device 830 may be updated.

The user may request the data broadcasting service while viewing a selected broadcasting channel, and may thus use the data broadcasting service that is provided from the data server 860 of the head end 810 while continuously viewing a broadcasting channel without changing the broadcasting channel. By updating a boot screen data on the basis of update information included in the application data for data broadcasting in a state where the broadcasting reception device 820 or the display device 830 is turned on, the updated boot screen data or a boot sound data may be outputted when the broadcasting reception device 820, the display device 830 and/or a device that is manufactured by combining the broadcasting reception device 820 and the display device 830 is booted a next time.

In FIG. 18, the broadcasting reception device 820 is included outside the display device 830 as a separate device. However, the broadcasting reception device 820 may be included in the display device 830 and thereby the broadcasting reception device 820 and the display device 830 may be implemented as one set. A device that is implemented as one set may be a digital TV.

The broadcasting system shown in FIG. 18 may be used for the data broadcasting service in limited spaces such as hotels or hospitals, for example, specific buildings.

An embodiment for changing a boot output data may be described with reference to a hotel broadcasting system for providing data broadcasting service in the hotel and general broadcasting service using a broadcasting signal received from the outside.

The broadcasting reception device 820 and the display device 830 may be provided in each of the guest rooms of the hotel. The head end 810 may receive a broadcasting signal from the outside over satellite or cable, and may transmit the received broadcasting signal together with a new boot output data and an application data for data broadcasting in the hotel, to a plurality of broadcasting reception devices 820 that are respectively provided in guest rooms.

For example, the data broadcasting service in the hotel may be a room interactive service including various services that may be provided in hotels, such as Pay Per View (PPV) service, room service, hotel information service, reservation service, checkout information service, entertainment service and/or game service.

Figure 19:
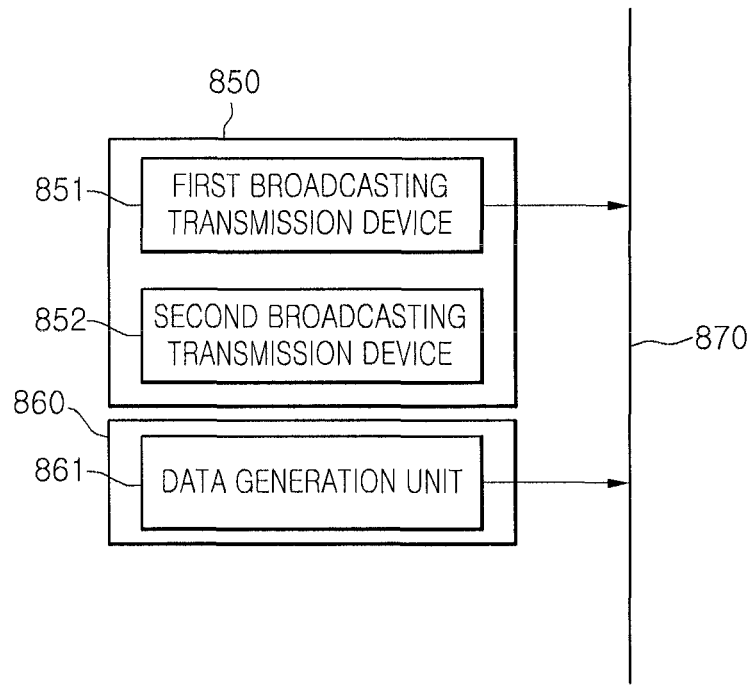
FIG. 19 is a block diagram illustrating a head end that is managed in a hotel, according to one embodiment.

FIG. 19 illustrates one embodiment of a head end 810 that is managed in hotel. The head end 810 in a hotel may include a broadcasting transmission device 850 and a data server 860. The broadcasting transmission device 850 may include a plurality of broadcasting transmission devices 851 and 852. The data server 860 may include a data generation unit 861.

The first and second broadcasting transmission devices 851 and 852 may receive different kinds of contents from the outside, and more specifically may receive a broadcasting signal from different broadcasting providers and/or receive a broadcasting signal over different communication networks.

The first broadcasting transmission device 851 may receive a broadcasting signal including content that is provided to users in the hotel free of charge from the outside to transmit the received signal to the broadcasting reception device 820, and may include a transcoder and a converter for processing the received broadcasting signal.

The first broadcasting transmission device 851 may include an encryption unit and a modulator for processing a broadcasting signal that is provided from a specific broadcasting provider (e.g., a broadcasting provider for providing pay content).

The second broadcasting transmission device 852 may receive a broadcasting signal including content that is provided to users for a fee from the outside to transmit the received signal to the broadcasting reception device 820. The second broadcasting transmission device 852 may include a Video On Demand (VOD) processing unit for processing a user's request for viewing of the pay content, and a modulator and a converter for processing the received broadcasting signal.

The VOD processing unit may include a central processing unit (CPU), a memory, a VOD multiplexer and a content server, for processing the above-described VOD service.

As shown in FIG. 19, the data server 860 in the hotel may include the data generation unit 861 that generates the new boot output data of the broadcasting reception device 820 and an application data for providing data broadcasting service in the hotel according to a predetermined data broadcasting standard.

For example, the data generation unit 861 may generate a new boot output data and an application data for providing the data broadcasting service in the hotel according to an Advanced Common Application Platform (ACAP) standard.

Data broadcasting information based on the ACAP standard may include Application Information Table (AIT) and Digital Storage Media-Command and Control (DSM-CC) data. The AIT and DSM-CC data may be transmitted as a transport stream type.

The AIT may include data broadcasting and update information, and the DSM-CC data may include substantial data for servicing data broadcasting, for example, control information such as text or images.

The data generation unit 861 may configure and output the DSM-CC data based on the ACAP standard by using images, text data and/or Electronic Program Guide (EPG) data that represent hotel-related information stored in the data server 860 or a new boot output data.

Referring to FIG. 19, an external broadcasting signal that is received in the broadcasting transmission device 850, a new boot output data and an application data for the data broadcasting service in the hotel that is provided from the data server 860 may be transmitted together over one communication network 870.

A broadcasting signal received in the first broadcasting transmission device 851, a broadcasting signal received in the second broadcasting transmission device 852, a boot output data and an application data generated in the data generation unit 861 may be respectively allocated to different channels and may be transmitted as one broadcasting signal to the broadcasting reception device 820 over the communication network 870 that is provided in the hotel.

The broadcasting signal that is received in the broadcasting transmission device 850 and the application data that is provided from the data server 860 may be transmitted together to the broadcasting reception device 820 over a Radio Frequency (RF) cable in the hotel.

The network system may transmit the application data for the data broadcasting service in the hotel over the RF cable that is provided for the broadcasting signal to the broadcasting reception device 820 provided in each guest room in the hotel, and thus can provide the data broadcasting service in the hotel by using the existing facilities without establishing a separate communication network in the hotel. The boot screen data, which is stored in the broadcasting reception device 820, the display device 830 or a device that is manufactured by combining the broadcasting reception device 820 and the display device 830, may be updated through the above-described system, thereby changing a boot screen or boot sound that is outputted when booting.

When a user requests the data broadcasting service in the hotel, the broadcasting reception device 820 may simultaneously transmit the video signal of the broadcasting channel and an application data and a boot output data for the data broadcasting so that the video of a broadcasting channel that is currently being viewed on the screen of the display device 830 and the video of the data broadcasting service may be displayed at a same time.

The application data for the data broadcasting service in the hotel or the boot output data may be transmitted together with the broadcasting signal over the communication network 870 in the hotel by using a data dedicated channel independent of the broadcasting channels over which the broadcasting signals are transmitted.

The application data for the data broadcasting service in the hotel may be transmitted to the broadcasting reception device 820 over a data dedicated channel independent of the broadcasting channels over which the broadcasting signal received in the broadcasting transmission device 850 is transmitted. The broadcasting channels may not include at least a portion of the application data for the data broadcasting service in the hotel, and the data dedicated channel may include only the application data including the boot output data.

The data broadcasting service in the hotel may be provided together with the video of the broadcasting channel by using the application data that is received over the data dedicated channel when there is a user's request, irrespective of a broadcasting channel that the user is currently viewing. Simultaneously, a new boot output data to be changed may be provided.

Figure 20:
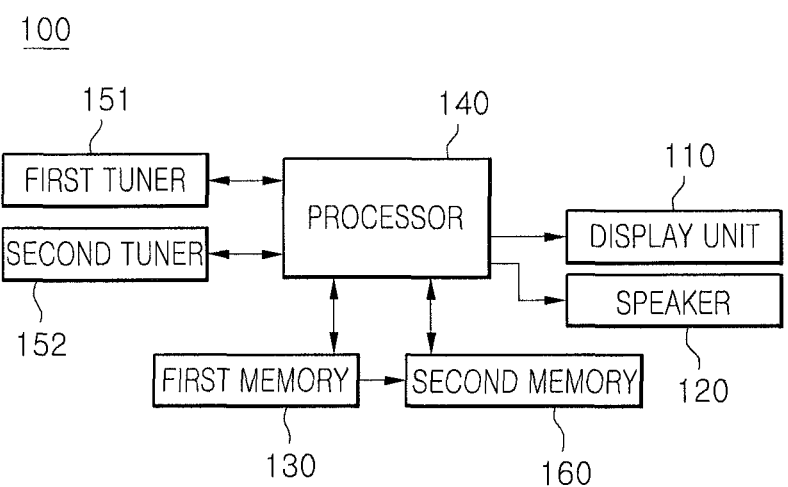
FIG. 20 is a block diagram illustrating a device that may be used as a broadcasting reception device or a display device (from FIG. 18)

FIG. 20 is a block diagram illustrating a display device 100 that may be used as a device that is manufactured by combining the broadcasting reception device 820 and the display device 830 in the network system 800 of FIG. 18. In FIG. 20, a display unit 110 may be an element corresponding to the display device 830 from FIG. 16, and other elements may correspond to the broadcasting reception device 820 from FIG. 16.

The display device 100 shown in FIG. 20 may include a display unit 110, a speaker 120, a first memory 130, a processor 140, and a second memory 160. The configuration and operations of these elements may be the same as FIG. 1. The display device 100 shown in FIG. 20 may include a first tuner 151 and a second tuner 152.

The first tuner 151 may receive a video signal corresponding to a broadcasting channel that is selected by a user from among a broadcasting signal transmitted from the head end 810 (where the sound signal of the broadcasting channel may also be received together).

The second tuner 152 may extract a signal corresponding to a data dedicated channel from among a broadcasting signal that is transmitted from the head end 810, and may receive an application data for the data broadcasting service in the hotel.

The second tuner 152 may be a data broadcasting dedicated tuner that is fixed in the data dedicated channel and thereby may receive only an application data that is provided from the data server 860 in the hotel.

The second tuner 152 may receive the signal of the data dedicated channel independent of a broadcasting channel that is received in the first tuner 151, and thus the broadcasting reception device 820 may simultaneously receive the video signal of a broadcasting channel selected by a user and an application data for the data broadcasting service in the hotel.

Even without changing a broadcasting channel that a user is currently viewing into a channel over which the application data is transmitted, the broadcasting reception device 820 may receive the application data for the data broadcasting service in the hotel and the video signal of the broadcasting channel together.

Figure 21:
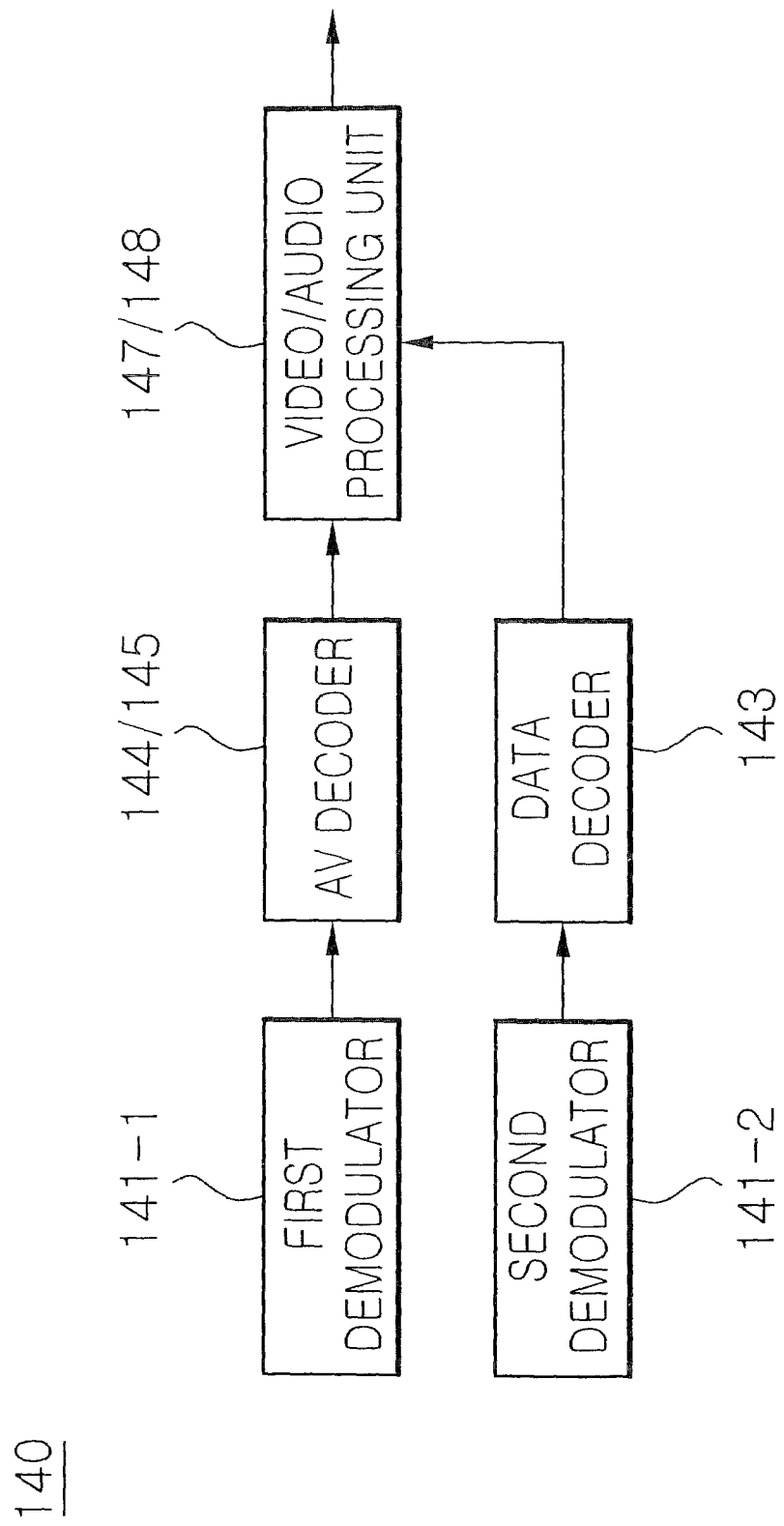
FIG. 21 is a block diagram illustrating a processor (from FIG. 20)

FIG. 21 illustrates a configuration of the processor 140. As shown in FIG. 21, a processor 140 may include first and second demodulators 141-1 and 141-2 for respectively processing signals that are received in the first and second tuners 151 and 152, an AV decoder 144/145, a data decoder 143, and a video and audio processing unit 147/148. The AV decoder 144/145 may represent the video decoder 144 and the audio decoder 145 (from FIG. 2) that are combined, and the video and audio processing unit 147/148 may represent the video processing unit 147 and the audio processing unit 148 (from FIG. 2) that are combined.

The first demodulator 141-1 may correct an error of the video signal of the broadcasting channel that is received in the first tuner 151 and convert the video signal into a TS type. The AV decoder 144/145 may decode the received video signal and audio signal in order to be outputted from the display device 830.

The second demodulator 141-2 may demodulate the application data that is received in the second tuner 152 as described above. The data decoder 143 may decode the application data to configure video for the data broadcasting service in the hotel.

For example, the data decoder 143 may decode the application data according to the ACAP standard to configure video for the data broadcasting service in the hotel.

The data decoder 143 may parse the AIT session of the application data to read an identifier corresponding to the DSM-CC data, and filter the DSM-CC data of a location corresponding to the identifier to extract substantial information for providing the video of the data broadcasting service in the hotel.

The video and audio processing unit 147/148 may combine the video data of a broadcasting channel outputted from the AV decoder 144/145 and the video data of a data broadcasting service outputted from the data decoder 143 so that the video/audio of a broadcasting channel selected by a user and the video of the data broadcasting service in the hotel can be simultaneously displayed on one screen.

Figure 22:
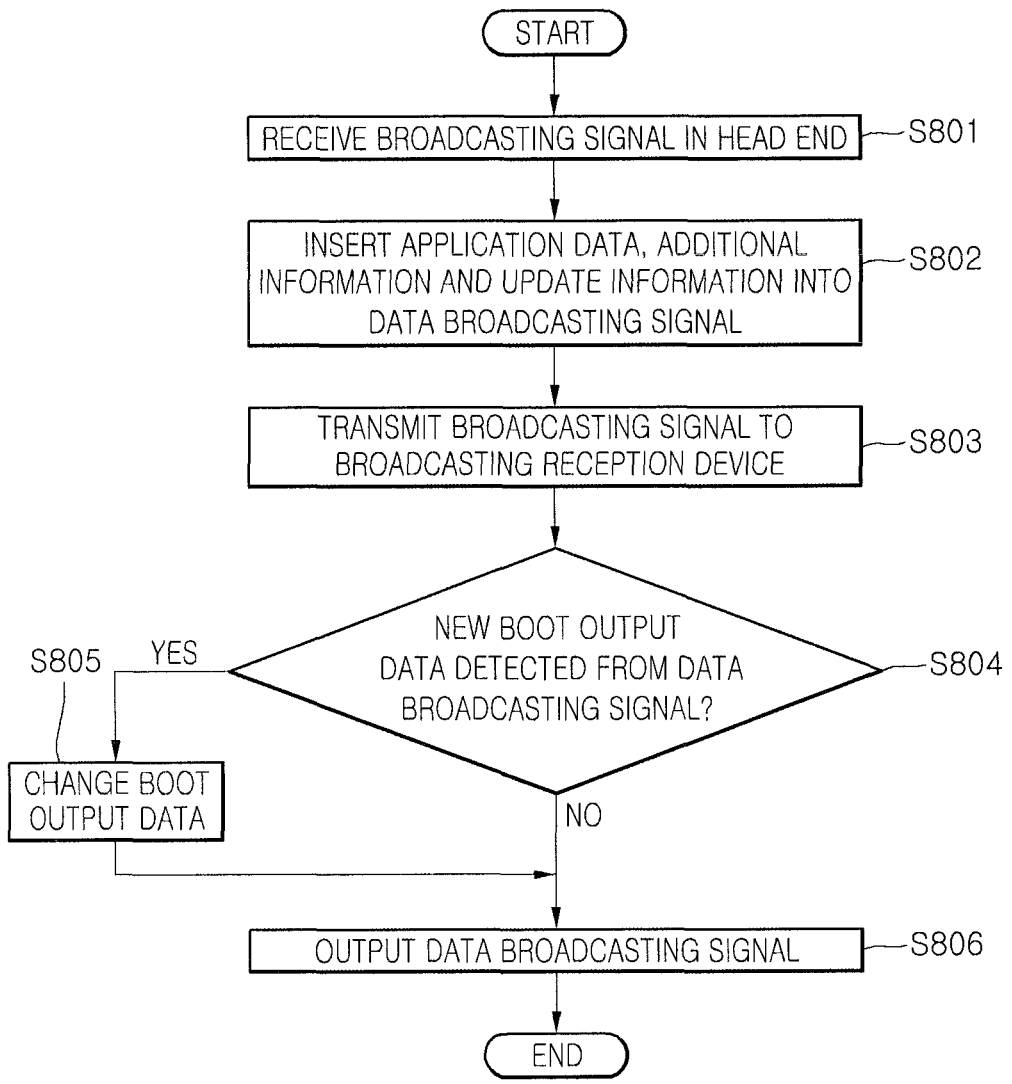
FIG. 22 is a flow chart illustrating a method for changing a boot output data of a broadcasting reception device through a network system, according to one embodiment.

FIG. 22 is a flow chart illustrating a method for changing boot output data of the broadcasting reception device 820 through the network system 800, according to one embodiment.

The head end 810 may receive a digital broadcasting signal in operation S801.

The head end 810 may insert a new boot output data into the data broadcasting signal of the received digital broadcasting signal in operation S802.

The head end 810 may transmit the digital broadcasting signal, into which the new boot output data is inserted, to the broadcasting reception device 820 in operation S803.

The broadcasting reception device 820 may parse a data broadcasting signal from among the received digital broadcasting signal, and check (or determine) whether the new boot output data is included in the parsed data broadcasting signal in operation S804. Whether the new boot output data is included in the parsed data broadcasting signal may displayed using the specific field of the header of the data broadcasting signal.

When the new boot output data is included, the network system 800 may change the existing boot output data that is stored in the memory of the broadcasting reception device 810 into a new boot output data in operation S805. When the new boot output data is not included, the network system 800 may output the received data broadcasting signal and an AV signal in operation S806.

Through the above-described method, the boot output data may be changed. After the boot output data is changed, a changed new boot screen or boot sound may be outputted when again booting.

An example of providing the data broadcasting service in the hotel has been described above of a broadcasting reception device, method and broadcasting system according to example embodiments, although embodiments are not limited thereto and may be used for various data broadcasting service that is provided in limited spaces other than hotels such as hospitals.

Figure 23:
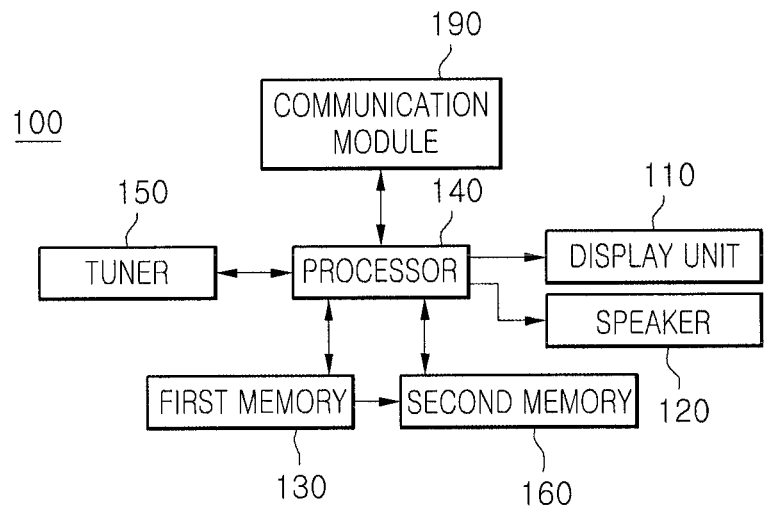
FIG. 23 is a block diagram illustrating a display device that may change a boot output data through a wired/wireless communication module, according to another embodiment.

FIG. 23 is a block diagram illustrating a display device that may change a boot output data through a wired/wireless communication module, according to another embodiment.

The display device 100 shown in FIG. 23 is a digital TV that may include a display unit 110, a speaker 120, a first memory 130, a processor 140, a tuner 150, and a second memory 160. Configuration and operation of these elements may be the same as or similar to FIG. 1.

The display device 100 shown in FIG. 23 may include a communication module 190 that may communicate with a server by a cable or by a wireless system. The communication module 190 may include an arbitrary communication module that may transmit/receive data to/from a server, such as an Ethernet module, a WiFi module, a bluetooth module, an IP TV set-top box and/or an RF communication module. The display device 100 may receive a file that includes data for replacing the existing boot screen data or boot sound data from the server through the communication module 190.

A server manipulator may allow the server to have a state in which the server may generate a new boot output data to transmit/receive data to/from the display device 100. The new boot output data may have a same format as a file that is pre-stored in the display device 100.

A new boot output data file may have a specific file name. In a state where the display device 100 is turned on, the processor 140 may check (or determine) whether a boot output data is included in data that is received through the communication module 190 when the display device 100 is connected to the server through the communication module 190. Whether the boot output data file is included may be displayed by allocating a specific field to the header of the received data or may be checked or determined from a specific file name.

When the boot output data is checked or determined as being included, the processor 140 may load the received boot output data to the second memory 160 to overwrite it in the boot screen data or boot sound data of a boot output data region from among information that is stored in the first memory 130. Therefore, a changed boot output data may be outputted from successive booting.

Figure 24:
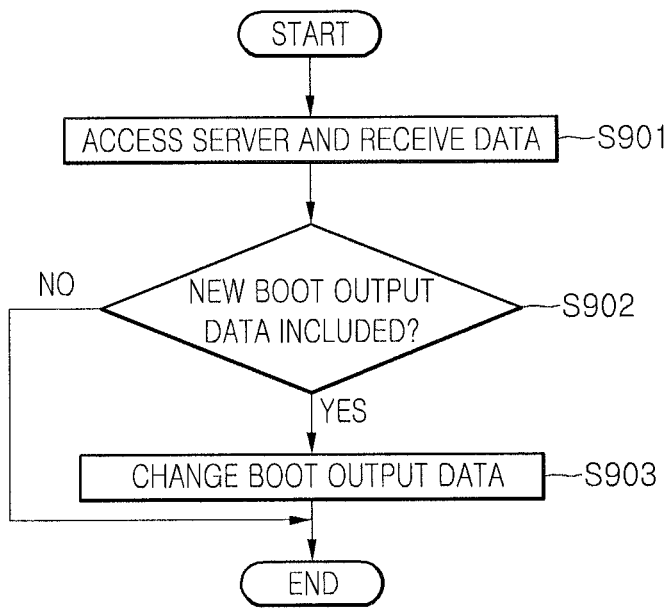
FIG. 24 is a flow chart illustrating a method for changing a boot output data through a wired/wireless communication module in a display device (from FIG. 23)

FIG. 24 is a flow chart illustrating a method for changing a boot output data through a wired/wireless communication module in the display device shown in FIG. 23.

The display device 100 may access a server for providing a new boot output data and receive data through the wired/wireless communication module 190 in operation S901.

The display device 100 may check or determine whether the new boot output data is included in the data that is received from the server by using a file name or a field value. When the new boot output data is not included in the received data, the display device 100 may end a process.

When the new boot output data for updating is included in the received data, the display device 100 may overwrite new data in a boot output data that is pre-stored in it.

Figure 25:
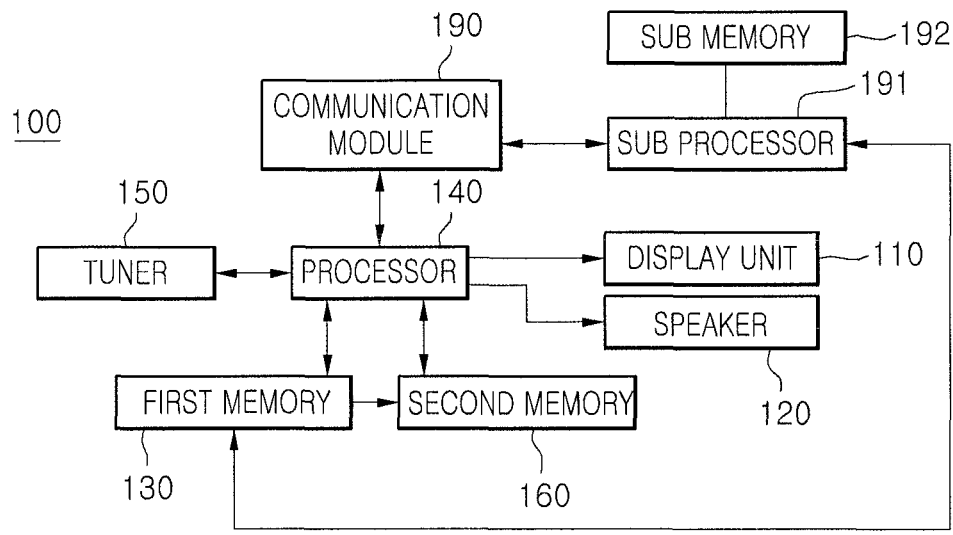
FIG. 25 illustrates a display device that may change a boot output data when it is in a standby state, according to another embodiment.

FIG. 25 illustrates a display device that may change a boot output data when it is in a standby state, according to another embodiment.

The display device 100 shown in FIG. 25 is a digital TV that may include a display unit 110, a speaker 120, a first memory 130, a processor 140, a tuner 150, and a second memory 160. The configuration and operation of these elements may be the same as or similar to FIG. 1.

The display device 100 shown in FIG. 25 may include a communication module 190, a sub processor 191 and a sub memory 192.

Similar to the communication module 190 described above with reference to FIG. 23, the communication module shown in FIG. 25 may perform wired/wireless communication with a server that stores a new boot output data.

Similar to the communication module in FIG. 23, the communication module in FIG. 25 may include an arbitrary communication module that may transmit/receive data to/from a server, such as an Ethernet module, a WiFi module, a bluetooth module, an IP TV set-top box and/or an RF communication module. The communication module 190 may not operate according to control of the processor 140 after booting of the display device 100 is completed, but the communication module 190 may operate according to control of the sub processor 191 when the display device 100 is in a standby mode.

The sub processor 191 may be a processor that operates even when the display device 100 is in the standby mode. In the standby mode, the sub processor 191 may communicate with the communication module 190 and control an IR receiver (not shown) to receive an input from a remote controller.

The sub memory 192 may be a memory that temporarily stores a boot output data that the communication module 190 receives when the display device 100 is in the standby mode. The existing boot output data stored in the first memory 130 may be replaced with a new boot output data, stored in the sub memory 192, by the sub processor 191.

The display device 100 may change a boot output data even while it is in the standby mode, efficiently providing necessary information to users. For example, when the display device 100 is a digital TV that is provided in the guest room of a hotel, in the standby mode, the display device 100 may receive the staying guest information of a boot screen data through communication between a hotel server and the communication module 190 and update the boot screen data with a recent staying guest name. Accordingly, when a staying guest enters a room and turns on the digital TV for the first time, as shown in FIG. 11, the staying guest may see a boot screen including its own name.

According to another embodiment, while the display device 100 is in the standby mode, a server (for example, a hotel server) may turn on the display device 100 through the communication module 190 and change the boot output data. In this example, the method that has been described above with reference to FIGS. 23 and 24 may be applied to an operation for changing the boot output data after the display device 100 is turned on.

Figure 26:
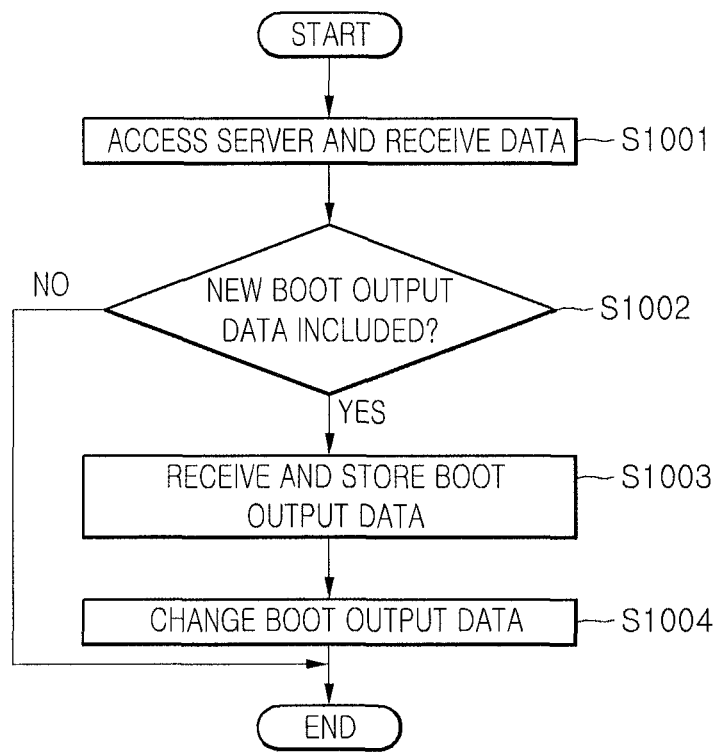
FIG. 26 is a flow chart illustrating a method for changing a boot output data in a display device (from FIG. 25).

FIG. 26 is a flow chart illustrating a method for changing a boot output data in the display device shown in FIG. 25.

While the display device 100 is in a standby mode, the communication module 190 may receive data from a server according to control of the sub processor 191 in operation S1001.

The display device 100 may check (or determine) whether a new boot output data is included in the received data in operation S1002. The presence of the new boot output data may be checked or determined on the basis of a file name or the information of the header of the received data. When the new boot output data is not included in the received data, the display device 100 may again proceed to the standby mode. When the new boot output data is included in the received data, the display device 100 may proceed to a successive stage.

While the display device is in the standby mode, communication between the communication module 190 and the server may be performed in real time, but the communication may be performed at certain time intervals, for example, at intervals of 10 minutes.

When the new boot output data is included in the received data, the display device 100 may receive new data and store the received data in the sub memory 192 in operation S1003.

Subsequently, the display device 100 may replace a boot output data, which is stored in it, with the received new data in operation S1004.

The display device may provide various information to users through a screen or a speaker while booting the display device such as a digital TV.

The display device may change a screen or sound, which is outputted when booting, in various types according to a user's desire, thereby maximizing usability of the display device during booting.

The display device may notify a user of the turn-on of a power supply source until before its normal screen is outputted, thereby enabling the user to easily recognize the turn-on of the display device.

Embodiments may also be embodied as computer readable codes on a computer-readable storage medium. The computer-readable storage medium may be any data storage device that can store data that can be thereafter read by a computer system. Examples of the computer-readable storage medium may include ROMs, RAMs, CD-ROMs, DVDs, magnetic tapes, floppy disks, registers, buffers, optical data storage devices, and carrier waves (such as data transmission through the Internet).

The computer-readable storage medium may also be distributed over network coupled computer systems so that the computer readable codes are stored and executed in a distributed fashion. Functional programs, codes, and code segments for accomplishing embodiments may be easily construed by programmers skilled in the art.

Embodiments may provide a display device and a control method thereof that can provide various information to users through a screen or a speaker while booting the display device.

Embodiments may also provide a display device and a control method thereof that change a screen or sound, outputted when booting, in various types according to a user's desire, thereby maximizing usability of the display device during booting.

A display device may be provided for displaying a boot screen that is configured with an image or additional information, characterized in that the display device outputs the boot screen during booting, and the display device may change the image and/or the additional information that configures the boot screen.

A display device may include a memory storing a boot screen data to be provided to a user when booting, an interface unit receiving the stored boot screen data and another boot screen data, a processor changing the stored boot screen data into the other boot screen data that is received in the interface unit, and performing controlling to output the boot screen data when booting according to a boot code that includes a command for outputting the boot screen data, and a display unit outputting the boot screen data according to control of the processor.

A method for boot screen data in a display device may include receiving a new boot screen data for replacing a pre-stored boot screen data through an interface unit, changing the pre-stored boot screen data into the new boot screen data that is received in the interface unit, reading a boot code that includes a command for outputting the new boot screen data, and outputting the new boot screen data according to the read boot code.

A display device driving method may include executing a boot code that includes a command for outputting a boot screen data (including an image or additional information), driving a function module for outputting the boot screen data according to the command, and simultaneously or sequentially outputting the image and the additional information on one screen.

A display device driving method may include reading a boot code that includes a command for outputting a boot sound data, driving a function module necessary for outputting the boot sound data according to the boot code, reading a boot sound data to be provided to a user when booting, and changing the boot sound data to output the changed data to a speaker.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a first tuner to receive a video signal corresponding to a broadcasting channel;
   a first memory to store boot output data to be provided when the display device is booted;
   an interface unit to receive new boot output data, wherein the interface unit includes a data broadcasting dedicated tuner and an external memory interface,
   wherein the data broadcasting dedicated tuner receives application data including a first new boot output data for data broadcasting service independent of the broadcasting channel, wherein the video signal of the broadcasting channel and the application data are simultaneously received, the application data and the first new boot output data are generated according to an Advanced Common Application Platform (ACAP) standard, and
   wherein the external memory interface receives a second new boot output data from an external memory;
   a second memory to store the received new boot output data and to load a boot code when the display device is booted;
   a processor to:
      change the boot output data stored in the first memory to the first new boot output data stored in the second memory when the application data includes the first new boot output data,
      change the boot output data stored in the first memory to the second new boot output data stored in the second memory when the external memory is connected to the external memory interface, and
      control outputting the received new boot output data based on the boot code that includes a command for outputting the received new boot output data when the display device is booted; and
   a display unit to display one of the boot output data and the received new boot output data according to control by the processor,
   wherein the received new boot output data can be the first new boot output data or the second new boot output data.

2. The display device of claim 1, wherein the output of the received new boot output data by the display unit is stopped when an application of the display device is executed.

3. The display device of claim 1, wherein configuration of the received new boot output data is changed based on a user's setting.

4. The display device of claim 1, wherein the data broadcasting dedicated tuner receives an application data including the received new boot output data from a server that transfers a broadcasting signal and the application data for data broadcasting service.

5. The display device of claim 1, wherein the received new boot output data includes boot screen data and boot sound data.

6. The display device of claim 5, wherein the boot screen data includes an image or additional information, wherein the image includes at least one of a photograph, a captured image, a channel browsing screen or a flash screen, and wherein the additional information include at least one of a guest number, a guest name, news, weather, geographic information, hotel introduction information, a bill, an advertisement or time information.

7. The display device of claim 6, wherein the boot code further includes screen configuration information when outputting the image or the additional information.

8. The display device of claim 5, wherein the command for outputting the received new boot output data includes a code for driving a function module for outputting the received new boot output data.

9. The display device of claim 8, wherein the function module for outputting the boot screen data includes an On Screen Display (OSD) module, a Low-Voltage Differential Signaling (LVDS) module, a video decoder module, or a General Purpose Input Output (GPIO) module, and wherein the function module for outputting the boot sound data includes a Digital Analog Conversion (DAC) module, a Low-Voltage Differential Signaling (LVDS) module, an audio decoder module or a General Purpose Input Output (GPIO) module.

10. The display device of claim 5, wherein the boot screen data is outputted to an On Screen Display (OSD) layer or a video layer of the display unit.

11. The display device of claim 5, wherein the boot screen data includes additional information or a set of images that are sequentially displayed.

12. The display device of claim 5, wherein the boot screen data includes an image configured with a flash file.

13. The display device of claim 5, wherein the boot sound data includes information on a guest room providing the display device or information to be provided to a staying guest.

14. The display device of claim 1, wherein the second new boot output data received at the external memory interface includes boot screen data and boot sound data.

* * * * *